United States Patent

[11] 3,631,751

[72] Inventor Gunter Stumpf
7421 Mehrstetten, am Kreis Munsingen, Germany
[21] Appl. No. 5,189
[22] Filed Jan. 23, 1970
[45] Patented Jan. 4, 1972
[32] Priority Dec. 2, 1969
[33] Germany
[31] P 19 60 473.0

[54] CUTTING MACHINE FOR FABRICS AND THERMOPLASTICS
10 Claims, 5 Drawing Figs.

[52] U.S. Cl. ............................................ 83/171,
83/527, 83/555, 83/563, 83/647, 83/925 CC
[51] Int. Cl. ............................................ B26d 5/08
[50] Field of Search ............................................ 83/171,
615, 628, 635, 564–565, 527, 647, 646, 647.5,
563, 925 CC; 30/272, 273, 275

[56] References Cited
UNITED STATES PATENTS
| | | | |
|---|---|---|---|
| 3,465,630 | 9/1969 | Burns | 83/925 CC X |
| 2,742,964 | 4/1956 | Levin | 30/273 |
| 2,662,413 | 12/1953 | Gallagher | 30/273 X |
| 800,550 | 9/1905 | Commander | 83/628 X |
| 2,623,283 | 12/1952 | Godfrey | 30/273 X |

FOREIGN PATENTS
| | | | |
|---|---|---|---|
| 139 | 1854 | Great Britain | 83/527 |

*Primary Examiner*—James M. Meister
*Attorney*—Waters, Roditi, Schwartz & Nissen ABSTRACT: A cutting machine has a reciprocally driven blade engaged by a guide unit at the free end of the blade. A blade-driving member is fixed above a cutting table on a projecting arm rigidly connected to the table and the guide unit is fixed beneath a plate on the table. Conversely the guide unit can be mounted on the supporting arm and the driving member beneath the plate on the table.

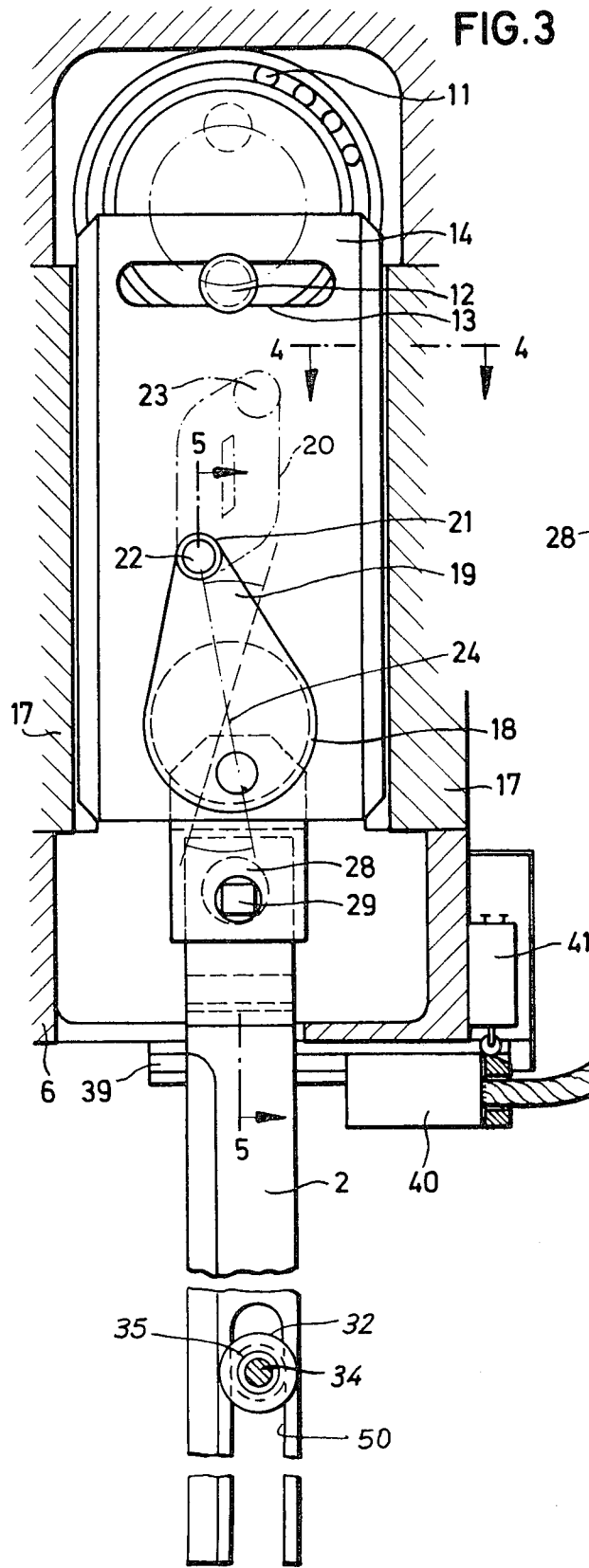
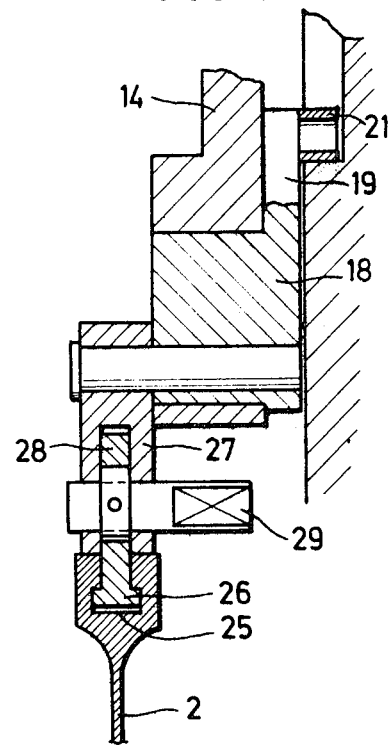
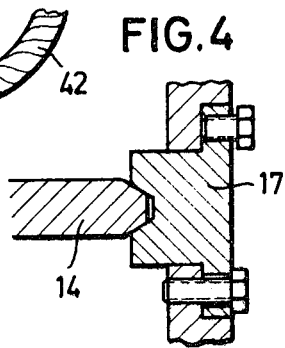

3,631,751

CUTTING MACHINE FOR FABRICS AND THERMOPLASTICS

FIELD OF INVENTION

BACKGROUND

This invention relates to a fabric-cutting machine. Known machines employ a continuous band blade for cutting stacks of folded fabrics and such blade has the advantage that it can be made with small cross-sectional dimensions e.g., 0.5×8 mm., and it can also neatly cut very narrow curves and borders. Basically, machines with reciprocating blades also possess this advantage. However, such machines have hitherto been designed for manual operation, so that between the fabric carrier or butting table and the operative part of the equipment there has to be a comparatively strong linkage which at the same time also serves as a slide for the cutter blade. Thus the intrinsic advantage of the small-dimensioned cutting tool is lost.

The aforementioned advantage of the band blade machines is, however, offset by the following disadvantages: replacement of the band blade, as desirable for working with a diversified range of materials, can only be effected with difficulty and much labor; the constructional requirement for control of the band blade through three or four deflecting pulleys, with necessary protective covers and the size of component parts to absorb the requisite strains and stresses is disproportionately high.

SUMMARY OF THE INVENTION

A fundamental object of this invention is, therefore, to provide a cutting machine which will possess the advantages of the continuous band machines without, however, having their drawbacks.

A crank drive through crankpins, a driving rod and a crosshead, as customarily employed for driving reciprocatory blades, results in the production of considerable vibrations in a cantilever design of cutting machine due to the unbalanced inertial forces. To prevent the incidence of such vibrations, the present invention provides a mass in counter displacement with the blade, thereby achieving a balance between ascending and descending massed.

In further accordance with the invention, the blade is supported by a drive means on one side of the cutting table and is guided at the other side of the table. In order to prevent dragging the topmost folds of a pile with the blade during ascent thereof, the blade is transversely oscillated over a small distance, e.g. 2 mm., the blade moving away from the cutting edge during ascent of the blade and returning to the cutting position at the top of its stroke. The invention further provides means to rapidly replace the blade in the drive means and to subsequently clamp it in position. There is also provided means to heat the blade for cutting the thermoplastic material. The heating of the blade additionally heat seals the cutting edges at the same time as cutting, for instance in woven-style plastics, to prevent fraying. It is also effective for the slitting or separation of sheets with simultaneous heat-seaming of two or more layers at the slit line. The machine also comprises means to inactivate the drive means when the blade is heated since cutting with heat does not require blade movement.

The invention is based on a cutting machine with a guide unit receiving the free end of the blade. The machine is characterized according to the invention by having its driving means fixed above the cutting table which is movable if necessary, preferably on a projecting support arm firmly assembled on the table, the guide unit being fixed underneath the table. Conversely, the guide unit can be mounted on the support arm and the driving means beneath the table.

Further details of the invention appear from the following embodiment of the invention depicted in the drawing, in which the driving means is fastened on the support arm and the guide unit is fixed beneath the table. It is clear, nevertheless, that the invention is not altered if conversely, the guide unit is fitted on the support arm and the driving means is located under the table.

BRIEF DESCRIPTION OF THE DRAWING

FIG. 3 is a section taken along line 3—3 in FIG. 2;

FIG. 4 is a section taken along line 4—4 in FIG. 3; and

FIG. 5 is a section taken along line 5—5 in FIG. 4.

DETAILED DESCRIPTION

Figure 1:
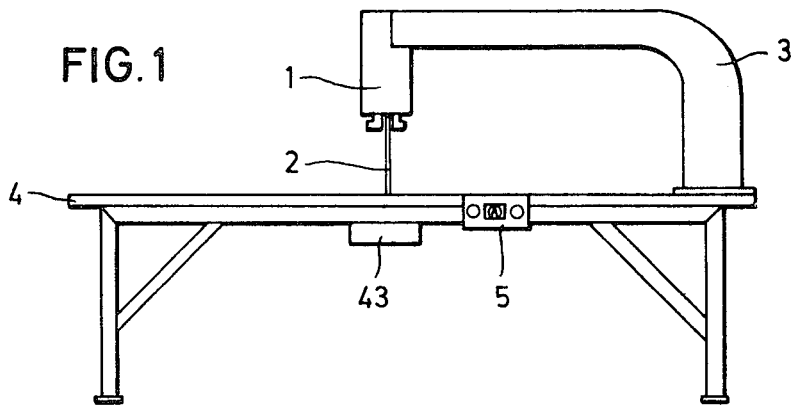
FIG. 1 is an elevation view of a cutting table with a reciprocating blade cutter on a supporting arm.

FIG. 1 shows a cutting machine which comprises a driving means 1 for a reciprocatory cutting blade 2, the driving means 1 being mounted on a supporting arm 3, having a vertical support section securely attached to cutting table 4. A control box 5 is mounted on the long side of the table for adjusting and regulating the driving means 1 of the blade 2.

Figure 2:
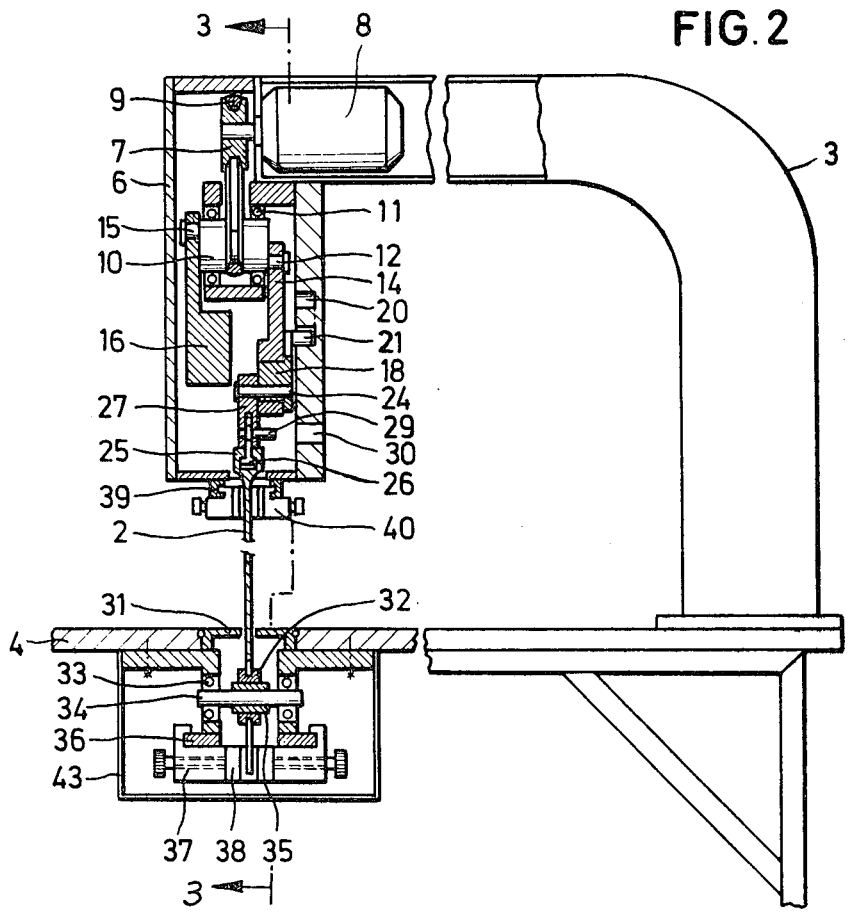
FIG. 2 is a section through the blade cutter showing the blade guide adapter under the table.

In FIG. 2 the construction of the driving means 1 is shown in detail. At the left end of the horizontal portion of the supporting arm 3, a housing 6 is fixed containing the constructional elements of the driving means. This includes a V-belt pulley 7 which is mounted on a shaft of a regulatable direct current motor 8. A V-belt 9 engages pulley 7 and drives a cam member 10, having two eccentric cam elements each of which is guidably supported in a respective ball bearing. A gudgeon pin 12 on the right cam element engages in a transverse slot 13 (FIG. 3) at the top of a slide bar 14 which, as will be explained later, imparts a rapid up and down reciprocatory motion in quick succession to the blade 2 which is connected to bar 14.

A gudgeon pin 15 on the left cam element is offset by 180° from gudgeon pin 12 and carries a counterweight 16, which moves upward and downward in opposition to slide bar 14.

In FIG. 4 the right longitudinal edge portion of the slide bar is shown with a tapered end slidably mounted for longitudinal movement in a transversely adjustable lateral guide 17. A similar guide is located at the other edge of the slide bar 14. Due to the fact that the gudgeon pin 12 engages in transverse slot 13 and can transmit only a vertical component of motion to slide bar 14, the otherwise conventional reciprocating masses required by a driving rod are avoided. Consequently the masses are balanced, so that, despite the arrangement of the drive means 1 on arm 3 which is comparatively elongated and cantilevered from its support, objectionable vibrations cannot accrue.

In order to prevent lifting of the topmost layers of a pile of material upon the ascent of the blade 2, the invention provides for drawing the blade back slightly, e.g. about 2 mm., from the cutting edge of the material before the blade starts its ascent. As shown in FIGS. 2 and 3, this is attained by rigidly linking the top end of the blade 2 to the front of a regulating cam 18. Cam 18 is pivotally mounted at one end in the slide bar 14 which moves vertically up and down. The other end of the regulating cam terminates in an external lever arm 19, the end of which carries a roller 21 running in a fixed slide block 20, as seen in FIG. 3. During up-and-down movement of bar 14, the regulating cam 18 connected to the bar executes an oscillatory movement at the respective end-of-stroke positions 22 and 23. The oscillatory movement is effected about a center 24, as shown in FIG. 3, through an angle such that blade 2 is withdrawn from the cutting edge at the beginning of ascent and then again moved toward the cutting edge at the beginning of descent.

In further accordance with the invention the blade 2 is readily replaceable and for this purpose the blade 2 is provided with a T-shaped slot 25 at its upper end (FIGS. 2 and 5), by which it is engaged on a corresponding T-shaped anvil piece 26 on a blade holder 27. A tensioning eccentric 28 is provided for clamping the blade tightly against blade holder 27 by rotating the eccentric after placement of blade 2 on the anvil piece 26. For turning the eccentric, there is provided a four-sided shaft 29 which can be engaged by a socket wrench through an opening 30 (FIG. 2) in the housing 6. Before fastening the blade to the driving means 1, the blade has to be pushed into a friction pulley (to be described later) located beneath the table 4, for which purpose hinged flaps 31 are provided to the right and left of the blade in the table.

The blade for a table-mounted device is longer than one for a portable device and a friction guide roll 32 with a peripheral slot is provided underneath the table. Roll 32 is electrically insulated, preferably by a ceramic insulation sheath 35, from a shaft 34 running in supporting ball bearings 33. A long slot 50 is machined in the blade and opens at the lower end thereof for its insertion into the peripheral slot on the roll 32. Thereby, the blade can ride along the roll 32 during its reciprocatory movement and be guided by said roll.

In addition to cutting textiles, the machine is also intended for thermally cutting plastic fabrics with simultaneous heat-sealing of the cut edges, for instance in woven-style plastic fabrics to prevent fraying, or in thermally cutting sheets with simultaneous heat-sealing of two or more layers at the place of cut. Therefore according to a further characteristic of the invention, the blade can be heated by means whereby the blade itself act s as a thermal resistance unit. For this purpose, an insulating guide bar 36, preferably plastic, is mounted both at the right and left sides of blade 2 beneath the table, each bar 36 having a movable circuit terminal 37 secured to a contact disk 38 of copper or similar material. When required, the disk 38 can be advanced to contact the blade. The same purpose is served by guide bars 39 with circuit terminals 40 on the underside of housing 6. Since cutting by means of a heated blade does not require any blade motion, switches are operated by the shifting of the circuit terminals toward the blade so as to prevent any inadvertent starting of driving motor 8. One of these switches is shown at 41 at the bottom of housing 6 in FIG. 3. As shown further in FIG. 3, circuit terminal 40 connected with power supply 42 is chamfered so that when the terminal 40 is pushed toward the blade, switch 41 becomes operative and disconnects driving motor 8 to inactivate the same. For purposes of easy regulation and control, the motor 8 is a direct current motor.

The elements beneath the table are enclosed by a protective cover 43 which is hinged to table 4.

As a source of current for heating the blade is a transformer (not shown) beneath the table which may be low voltage, e.g. 6 volt, and deliver a high current, e.g. 250 amps. To regulate the heat output, the transformer can be stepped over several stages. Since in the thermal cutting process, the omission of the up-and-down motion of the blade reduces the mechanical strain on the blade to a minimum, it is advantageous to employ a special blade having the smallest possible cross sectional area, e.g. 3 sq. mm., so as to keep the amperage low. Here, too, there is the advantage of convenient and easy replacement of the blade as previously mentioned.

What is claimed is:

1. A cutting machine comprising a reciprocating blade having a cutting edge for cutting stacks of fabric or other material, guide means for the reciprocating blade, a cutting table, a projecting supporting arm fixedly mounted on said table, a drive unit on said arm, said guide means being mounted below the table, said drive unit including a motor supplying rotary motion, means for converting the rotary motion to a pushing motion for the reciprocating blade, said means including a vertically reciprocable slide bar guided laterally in said housing and provided with a transverse groove, a double cam driven by said motor and including discs, and pins on the discs, the pin of one of the discs being guided in the transverse groove in the reciprocable slide bar, an adjusting cam rotatable in the slide bar and connected with the reciprocating blade, a lever arm connected with the adjusting cam, a roll on said arm, and a slide block in the housing guiding said roll and having lower and upper stroke end positions and being adapted such that on up-and-down movement of the slide bar the adjusting cam swings at the stroke end positions relative to the slide bar whereby the reciprocating blade is continually reciprocated transversely of the cutting edge in addition to along the same.

2. A machine as claimed in claim comprising means detachably connecting said blade to said adjusting cam and comprising a blade holder, a tensioning eccentric carried by said blade holder, said blade holder having a T-shaped groove in which said eccentric is slidably inserted, and means engaging said eccentric to clamp the blade tightly against said blade holder.

3. A machine as claimed in claim 1 wherein said means engaging said eccentric comprises a bolt with a turntable shaft accessible via an opening provided in said housing.

4. A machine as claimed in claim 1 wherein said guide means comprises a guide roll having a circumferential groove, said blade being engaged and guided in the circumferential groove of the said guide roll.

5. A machine as claimed in claim 4 comprising a shaft supporting said guide roll and a ceramic insulation sheath interposed between said shaft and pulley to electrically insulate said guide roll.

6. A machine as claimed in claim 2 comprising means for electrically heating said blade to effect cutting without movement of said blade, and means for inactivating said drive means when the electrical heating means is activated.

7. A machine as claimed in claim 6 wherein said means for electrically heating said blade comprises means for connecting said blade itself in circuit as a resistance to effect heating thereof.

8. A machine as claimed in claim 7 wherein said means for connecting said blade in circuit comprises two sets of displaceable terminals on opposite sides of the blade at spaced locations therealong, said terminals being coupled to a source of voltage and adapted for contact with the blade.

9. A machine as claimed in claim 8 wherein one of said sets of terminals is below said table and the machine further comprises a hinged cover plate covering said one set of terminals.

10. A machine as claimed in claim 1 wherein said drive motor is a regulatable DC motor.

* * * * *